(12) United States Patent
Atagun et al.

(10) Patent No.: US 10,185,959 B2
(45) Date of Patent: *Jan. 22, 2019

(54) SHARED POOLS FOR COMMON TRANSACTIONS

(71) Applicant: PayPal, Inc., San Jose, CA (US)

(72) Inventors: Firat S. Atagun, Cupertino, CA (US); Gopi Krishna, Fremont, CA (US); Srinivasan Raman, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,240

(22) Filed: Feb. 20, 2018

(65) Prior Publication Data

US 2018/0174153 A1    Jun. 21, 2018

Related U.S. Application Data

(63) Continuation of application No. 15/161,486, filed on May 23, 2016, now Pat. No. 9,934,505, which is a continuation of application No. 13/713,280, filed on Dec. 13, 2012.

(51) Int. Cl.
| | |
|---|---|
| *G06Q 20/40* | (2012.01) |
| *G06Q 20/22* | (2012.01) |
| *G06Q 40/02* | (2012.01) |
| *G06Q 20/10* | (2012.01) |
| *G06Q 20/32* | (2012.01) |

(52) U.S. Cl.
CPC ....... *G06Q 20/40145* (2013.01); *G06Q 20/10* (2013.01); *G06Q 20/22* (2013.01); *G06Q 20/322* (2013.01); *G06Q 40/02* (2013.01)

(58) Field of Classification Search
CPC .............................. G06Q 20/00; G06Q 40/02
USPC .......................................................... 705/35
See application file for complete search history.

(56) References Cited

U.S. PATENT DOCUMENTS

| | | | | |
|---|---|---|---|---|
| 6,173,272 B1 * | 1/2001 | Thomas | ................. | G06Q 20/00 705/42 |
| 6,513,018 B1 * | 1/2003 | Culhane | ................. | G06Q 40/00 705/35 |
| 6,847,942 B1 * | 1/2005 | Land | ..................... | G06Q 30/04 705/30 |
| 7,383,226 B2 * | 6/2008 | Kight | ..................... | G06Q 20/04 705/40 |

(Continued)

*Primary Examiner* — Chikaodinaka Ojiaku
(74) *Attorney, Agent, or Firm* — Haynes and Boone, LLP

(57) ABSTRACT

A funding source is provided by each of a plurality of users for setting up an electronic shared payment pool. A policy governing rights or obligations of each of the users is set up. The includes: for each user, a respective threshold for enabling funds to be pulled automatically from the funding source of said user. The electronic shared payment pool is created based on the respective funding sources and the policy. A detection is made that a user is requesting to use the electronic shared payment pool to pay for a prospective transaction. In response to the detection, funds are pulled from the funding sources into the electronic shared payment pool. The funds are pulled automatically without requiring an approval from each of the users as long as the pulled amount is below the threshold for that user. The prospective transaction is facilitated using the electronic shared payment pool.

20 Claims, 3 Drawing Sheets

(56) References Cited

U.S. PATENT DOCUMENTS

| | | | |
|---|---|---|---|
| 8,055,564 B2* | 11/2011 | Wehunt | G06Q 10/00 705/35 |
| 8,065,190 B2* | 11/2011 | Collas | G06Q 20/12 705/26.1 |
| 8,090,656 B2* | 1/2012 | Solomon | G06Q 20/108 705/35 |
| 8,341,074 B1* | 12/2012 | Reid | G06Q 40/02 705/30 |
| 8,401,968 B1* | 3/2013 | Schattauer | G06Q 20/3255 235/380 |
| 9,152,974 B1 | 10/2015 | Behm et al. | |
| 2002/0116331 A1* | 8/2002 | Cataline | G06Q 20/00 705/39 |
| 2002/0161630 A1* | 10/2002 | Kern | G06Q 30/02 705/14.32 |
| 2003/0028483 A1* | 2/2003 | Sanders | G06Q 20/10 705/40 |
| 2003/0055779 A1 | 3/2003 | Wolf | |
| 2003/0135438 A1 | 7/2003 | Blagg et al. | |
| 2004/0044616 A1* | 3/2004 | Salter | G06Q 40/02 705/38 |
| 2005/0165684 A1* | 7/2005 | Jensen | G06Q 20/00 705/44 |
| 2005/0268107 A1* | 12/2005 | Harris | G06F 21/31 713/182 |
| 2006/0259358 A1* | 11/2006 | Robinson | G06Q 30/02 705/14.41 |
| 2006/0288367 A1* | 12/2006 | Swix | H04N 7/17318 725/46 |
| 2007/0106558 A1* | 5/2007 | Mitchell | G06Q 20/0453 705/16 |
| 2007/0168910 A1* | 7/2007 | Radford | G06F 11/3616 717/101 |
| 2007/0174160 A1* | 7/2007 | Solberg | G06Q 10/087 705/35 |
| 2007/0179873 A1* | 8/2007 | Solberg | G06Q 40/00 705/35 |
| 2007/0198382 A1* | 8/2007 | Ferrari | G06Q 40/00 705/35 |
| 2007/0282743 A1* | 12/2007 | Lovelett | G06Q 20/10 705/40 |
| 2008/0004989 A1* | 1/2008 | Yi | G06Q 30/02 705/26.1 |
| 2008/0046366 A1* | 2/2008 | Bemmel | G06Q 20/20 705/44 |
| 2008/0167980 A1* | 7/2008 | Aaron | G06Q 20/14 705/35 |
| 2008/0183619 A1* | 7/2008 | Gould | G06Q 20/102 705/40 |
| 2008/0183819 A1 | 7/2008 | Gould et al. | |
| 2008/0201769 A1* | 8/2008 | Finn | G06Q 20/04 726/7 |
| 2008/0226136 A1* | 9/2008 | Takaku | G07C 9/00158 382/115 |
| 2008/0228637 A1 | 9/2008 | Scipioni et al. | |
| 2008/0320036 A1* | 12/2008 | Winter | G06F 17/30265 |
| 2009/0006151 A1* | 1/2009 | Zarghami | G06Q 10/06375 705/7.31 |
| 2009/0006398 A1* | 1/2009 | Lam | G06Q 30/02 |
| 2009/0024533 A1* | 1/2009 | Fernandes | G06Q 20/10 705/75 |
| 2009/0112747 A1* | 4/2009 | Mullen | G06Q 20/04 705/35 |
| 2009/0194584 A1* | 8/2009 | Alexander | G06Q 40/02 235/379 |
| 2009/0265252 A1* | 10/2009 | Fletcher | G06Q 30/04 705/26.1 |
| 2010/0036770 A1 | 2/2010 | Fourez et al. | |
| 2010/0138341 A1 | 6/2010 | Solomon et al. | |
| 2010/0312636 A1* | 12/2010 | Coulter | G06Q 20/10 705/14.38 |
| 2011/0078073 A1* | 3/2011 | Annappindi | G06Q 40/02 705/38 |
| 2011/0106698 A1* | 5/2011 | Isaacson | G06Q 20/105 705/41 |
| 2011/0178883 A1 | 7/2011 | Grandbery et al. | |
| 2012/0030091 A1* | 2/2012 | Hu | G06Q 40/02 705/38 |
| 2012/0054100 A1* | 3/2012 | Pfohl | G06Q 30/0279 705/44 |
| 2012/0084177 A1* | 4/2012 | Tanaka | G06Q 30/0613 705/26.41 |
| 2012/0143761 A1* | 6/2012 | Doran | G06Q 20/08 705/44 |
| 2012/0166298 A1 | 6/2012 | Smith et al. | |
| 2012/0173349 A1* | 7/2012 | Buckley | G06Q 20/10 705/16 |
| 2012/0239569 A1 | 9/2012 | Solomon et al. | |
| 2012/0303425 A1* | 11/2012 | Katzin | G06Q 20/027 705/14.4 |
| 2013/0006782 A1 | 1/2013 | Schwarzkopf et al. | |
| 2013/0006853 A1* | 1/2013 | Amundsen | G06Q 40/00 705/40 |
| 2013/0030890 A1* | 1/2013 | Richardson | G06Q 30/00 705/14.14 |
| 2013/0041824 A1 | 2/2013 | Gupta | |
| 2013/0054330 A1* | 2/2013 | O'Donnell | G06Q 30/06 705/14.23 |
| 2013/0060623 A1* | 3/2013 | Walker | G06Q 30/0259 705/14.27 |
| 2013/0173467 A1 | 7/2013 | Nuzzi et al. | |
| 2013/0173714 A1 | 7/2013 | D'Amore et al. | |
| 2014/0006205 A1 | 1/2014 | Berry et al. | |
| 2014/0156508 A1* | 6/2014 | Argue | G06Q 20/32 705/39 |
| 2014/0279098 A1 | 9/2014 | Ham | |
| 2015/0031393 A1 | 1/2015 | Post et al. | |
| 2015/0302384 A1 | 10/2015 | Aadi et al. | |
| 2016/0350848 A1 | 12/2016 | Acharya et al. | |

\* cited by examiner

SHARED POOLS FOR COMMON TRANSACTIONS

CROSS REFERENCED TO RELATED APPLICATIONS

The present application is a continuation application of U.S. patent application Ser. No. 15/161,486, filed on May 23, 2016, which is a continuation of U.S. patent application Ser. No. 13/713,280, filed on Dec. 13, 2012, entitled "Shared Pools for Common Transactions" the disclosure of which is hereby incorporated by reference in their entirety.

BACKGROUND

Technical Field

Embodiments of the present disclosure generally relate to transactions, and more particularly, to methods and systems for shared pools for sharing funds between a group of members or users for common transactions.

Related Art

In electronic commerce, users may routinely use various funding sources such as credit cards to purchase and pay for applications, products and/or services from online merchants over communication networks such as the Internet. However, typical ways of making payments over the Internet may be cumbersome and inconvenient if a group of users desires to make purchases or pay for common expenses as needed by one or more individual users in a business or personal relationship. Currently, for example, if a group of users desires to purchase a product or service online, one of the users may have to use his or her own individual account to pay for the application, product or service on behalf of the group of users or members, and then collect appropriate reimbursement from each of the other users or members of the group. As such, there is a need for more convenient ways to address potential problems with current group situations such as this.

BRIEF DESCRIPTION OF THE FIGURES

Like element numbers in different figures represent the same or similar elements.

Figure 1:
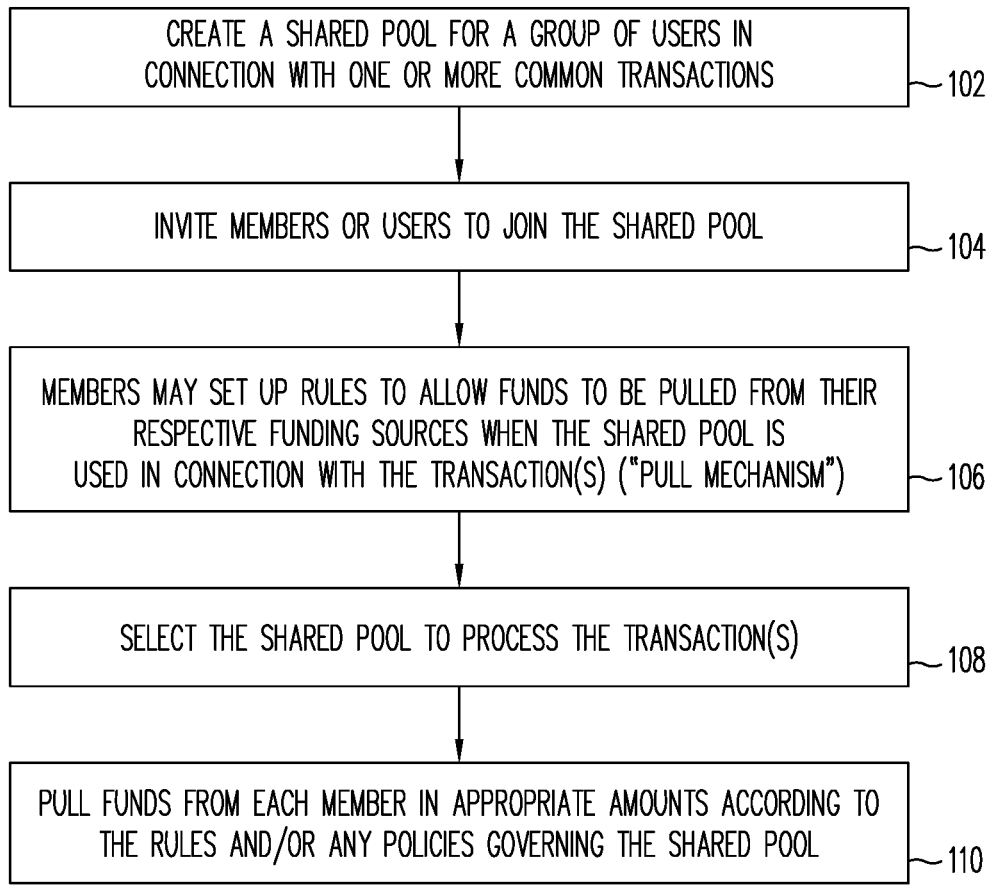
FIG. 1 illustrates a flow diagram for a shared pool according to an embodiment of the present disclosure.

Various features and advantages of the embodiments of the present disclosure will be more readily apparent from the detailed description of the embodiments set forth below taken in conjunction with the accompanying drawings.

DETAILED DESCRIPTION

In accordance with various embodiments described herein, methods and systems are provided for establishing, managing and using shared pools created between a group of users or members for use in connection with common transactions, for example, to pay for recurring expenses such as monthly living expenses, to purchase and pay for a particular application, product and/or service ("item"), to make a donation to a charity, to pay for a social subscription, etc.

A shared pool according to one or more embodiments may be shared by many users and may be established for funding in connection with common transactions according to policies that govern the shared pool including privileges and/or obligations of the different members or users. In various embodiments, each particular member or user of the group may set up rules, restrictions, procedures, or the like ("rules") for pulling funds from the individual user's funding sources when the shared pool is used in connection with a transaction. In embodiments herein, the shared pool established by the group of users may allow each member of the group to select or designate funding sources that may be used in connection with common transactions. For example, an individual user may designate a hierarchy of funding sources to be used for payment made when the shared pool is used in connection with a transaction (e.g., use a payment provider service first, then a transaction card such as Visa, etc.). Also, the individual user may designate a maximum amount of funds that may be used for the shared pool, a time and/or place where the funds may be used, and/or any other appropriate rules for pulling funds for the shared pool.

According to an embodiment, the group of members or users may set up and use the shared pool through a payment service provider. The payment service provider may be, for example, PayPal®, Inc. and/or eBay®, Inc. of San Jose, Calif., USA.

In traditional group payment accounts, users may generally contribute actual funds to a group payment account to, for example, pay for an item such that the group payment account is used when there is a sufficient amount of funds in the group payment account to cover the cost of the item. In a shared pool according to one or more embodiments of the present disclosure, individual members or users of the shared pool may not wish to contribute actual funds to the shared pool, instead, they may keep or maintain funds in any funding source or account including their own respective individual funding sources or accounts. In this regard, members or users of the shared pool may simply give authorization to "pull" funds from a designated funding source account, for example, from a payment service provider account of the individual user, and/or according to any rules that may be set up by individual users, when the shared pool is selected in connection with funding of a common transaction.

A shared pool according to one or more embodiments may provide individuals an option to collaborate on sharing funds for common transactions such as purchases or expenses. The shared pool may be created by a user initiating the pool and inviting one or more users to join the shared pool. Once a user accepts the invitation to join a shared pool, the user becomes a member of the shared pool. Shared pool members may be any individual person or entity including, for example, individuals in personal or business relationships, employees, friends, family, or anyone.

Advantageously, the shared pool may increase user engagement and collaboration, availability of funds, convenience, reporting, sharing common expenses, spending from a common source, increasing the ability for a group of users to use features of a funding source such as a payment service provider, drive more users to use a funding source, and/or open a new path for further innovation.

Referring now to the drawings wherein the showings are for purposes of illustrating embodiments of the present disclosure only, and not for purposes of limiting the same, FIG. 1 illustrates a flow chart for a shared pool according to an embodiment of the present disclosure.

In block 102, a shared pool may be created between a group of users or members for sharing funds in connection with one or more common transactions.

In various embodiments, a user may create and set up a shared pool using, for example, a shared pool application loaded on a user device by an appropriate entity such as a payment service provider, a merchant, or the like. The shared pool may be set up between the group of users or members in connection with common transactions, for example, to pay for common living expenses, to purchase and pay for a particular item, to make a donation to charity, to pay for a subscription, etc. It should be understood that there may be a variety of uses or purposes for the shared pool and it is up to the creativity of the users involved to determine such uses or purposes of the shared pool.

To create the shared pool, a user may perform several tasks such as establishing configuration details including, for example: 1) setting up policies to establish the privileges and/or obligations governing the shared pool, for example, setting uses or purposes for the shared pool (e.g., sharing monthly roommate expenses, purchasing an item, making a donation to charity, paying a subscription, etc.), determining how payments are to be split between the users (amounts, percentages, etc.), setting forth the contribution requirements of the users, setting forth the termination conditions for the shared pool, setting forth a description of the roles of the users, and/or any other appropriate terms and conditions; and/or 2) choosing other users to invite to be members of the shared pool, for example, friends from a social networking site, business partners, roommates, or any other appropriate individual or entity. Shared pool members may introduce policies for better control of the shared pool usage. For example, a shared pool member may enforce that every purchase requires his or her approval.

In various embodiments, there may be a set of membership roles defined for a shared pool. For example, there may be one or more Shared Pool Owners or Administrators. Shared Pool Owners or Administrators may have various controls such as being able to add and remove Owners, Administrators and/or members. The shared pool may be dynamic, that is, shared pool members may be added and/or removed at any time.

In various embodiments, all individual members may not be equal contributors of the shared pool. Different individual members may pay different amounts of a single payment. For example, a shared pool policy may be set up such that members have an obligation to equally split a payment amount for a transaction, e.g., to cover a certain expense for an item, for instance, a shared pool having 2 members may equally split (50-50) an amount for a transaction (each member pays $50 for a $100 item). In other examples, the amount to cover a transaction may be split between the members according to unequal percentages or amounts, that is, one member may be obligated to pay 50% of a total amount, a second member may be obligated to pay 25% of the total amount, and a third member may be obligated to pay 25% of the total amount (for a $100 item, User A pays $50, User B pays $25 and User C pays $25). This case may apply, for example, in business or roommate situations where a business partner has a larger equity in a business, or a roommate has a larger area of living space in an apartment, etc. It should be appreciated that there are many examples for setting up policies to establish privileges and obligations for the members of the shared pool. The examples given herein with respect to policies governing the shared pool including member obligations and splitting amounts are not intended to limit this disclosure.

In various embodiments, a user may log in to a website, for example, a social networking site, a payment service provider site, a financial institution site, etc. where the user may add and view an application in the website. In embodiments herein, the website may be used to create and manage a shared pool. In other embodiments, other types of communications over a network may be used to create and manage the shared pool.

In an embodiment where the shared pool is created and/or managed through a payment service provider such as PayPal®, the user may be asked if he or she has an account with the payment service provider. The payment service provider may be capable of maintaining and managing a shared pool and may include funding information or resources therein. In embodiments where the user does not have an existing account with the payment service provider, the user may apply for an account with the payment service provider. Once the user has an account with the payment service provider, the user may set up a shared pool account. The payment service provider may keep and manage the shared pool and any related configuration details.

In an embodiment, the user may log in to his or her individual account with the payment service provider and may review and confirm the configuration details of the new shared pool. If desired, the user may have the option to change the configuration details of the shared pool. By login into his or her individual account with the payment service provider, the user may access the shared pool through his or her payment service provider account. Login into the payment service provider account may be done through a secure way; for example, the user may be required to enter credentials for authentication such as a PIN, username/password, etc.

The payment service provider may verify that a shared pool has been created and may provide identification information for the shared pool. In various embodiments, a shared pool may be given a name, for example "Roommate Monthly Expenses Shared Pool," "Startup Business Expenses Shared Pool," or any other appropriate name that may fit the uses and purposes of the shared pool.

Once the user has created a new shared pool that may be identified, for example with an identification provided by the payment service provider, the user may review and change the configuration details of the shared pool at any time or as provided in the policies of the shared pool.

The user may read in detail and edit or change the configuration details of the shared pool including the policies or any terms and conditions governing the privileges and obligations of the users of the shared pool. The user that created the shared pool may be designated as the only user that may manage the shared pool and edit or change the configuration details of the shared pool. However, any other user or member may also be permitted to manage and edit or change the configuration details of the shared pool. Such designations and related terms and conditions may be provided in, for example, the policies governing the shared pool.

Purposes of the shared pool may also be edited to reflect, for example, a change in amount of money needed to process transactions, the type of item to be purchased, etc.

Shared pool activity may be accessible to the members, for example, updates related to the shared account may be posted on a regular basis.

In block 104 of FIG. 1, members or users may be invited to join the shared pool. Any number of users or members may be invited and may join the shared pool as appropriate for the uses or purposes of the shared pool. Invitations may be sent to other users including, for example, social networking website friends, roommates, business partners, etc. or anyone that may be interested in joining the shared pool. The invitation list and the status of pending invitations may be reviewed.

In one or more embodiments, members may be added to a shared pool and be made payment participants or contributors either after a transaction has been processed (e.g., after a payment has been made) or before a transaction has been processed (e.g., before a payment has been made).

In an embodiment, after a payment has been made using the shared pool, a new payment participant may be added to that payment. The new payment participant may be an existing member of the shared pool, or a new member of the shared pool. For example, a member may decide to join the shared pool or be made a payment participant or contributor after a payment has been made because, for example, the user may desire to contribute funds for a good cause after a donation to a charity has been made, or to pitch in for a group gift to get his or her name added to the gift, or for any other appropriate purposes or situations.

Conversely, an existing member of a shared pool may not wish to participate in a particular transaction or may drop out of the shared pool, for example, in cases where the member does not wish to make a payment for a certain expense (e.g., the member may not want to contribute to a certain charity or for a certain gift to a person he may not know, or for any other reason). In this case, the remaining members may split the payment amount between themselves according to predetermined percentages or amounts.

In other embodiments, a user or member conducting a particular transaction (e.g., the user making a payment) may select a subset of the members of a shared pool for participating in the particular transaction. For example, in occasions when only some of the members of a shared pool want to contribute to buy an item, or only some, but not all the members participate in an outing such as a dinner, then only such participating members may be selected, for example, from a list of shared pool members for contributing to the particular transaction.

An invited user may decide whether to accept or reject the invitation to join a shared pool. An invited user may simply decide to reject or accept the invitation and the appropriate communication of the rejection or acceptance is made.

In embodiments where a shared pool is implemented by a payment service provider, the invited user may be asked if he or she has an account with the payment service provider. If the invited user does not have an account with the payment service provider, then the invited user may apply for such an account. Once the invited user has a current account with the payment service provider, the invited user may review and decide whether to accept any terms and conditions set forth in any applicable policies governing the shared pool, including, for example, termination conditions, roles of the users or members, contribution requirements, percentages or amounts due by each user or member, etc.

If an invited user decides not to accept the policies governing the shared pool, the invited user may reject the invitation. On the other hand, if the invited user decides to accept the policies governing the shared pool, the invited user accepts the invitation.

In one embodiment, an invited user may log into his or her payment service provider account and confirm the acceptance of the invitation. This may also connect the invited user's payment service provider account to the shared pool. Login to the payment service provider may be done in a secure manner, for example, through a User and Password or other credential so that the login information is not compromised.

The invited user may then be confirmed and successfully join as an active member of the shared pool.

In an embodiment, in addition to any policies governing the shared pool, a shared pool member may opt in to receive an authorization notification when certain activity occurs with respect to the shared pool. For example, a member may opt in to be notified every time a transaction occurs (e.g., a purchase is made) using the shared pool in which they are a participant, or when a transaction in which they are a participant is over a certain amount or quantity limit, or when any other appropriate shared pool activity occurs. For users or members that opt in to receive authorization notifications, the system may send a notification to their registered user device providing details of the activity, and providing an ability for the user to accept or reject the transaction. Members may also view shared pool information such as the list of other users that have been invited to be members of the shared pool, a list of the current members of the shared pool, etc.

A shared pool may be funded according to a Funding Model as described below with respect to one or more embodiments.

It should be appreciated that members or users may also be removed from the shared pool. Also, the shared pool may be deleted at any time. For example, the shared pool may be closed automatically after a certain time, or it may be closed by a designated user or member, or by any user or member, as may be set forth, for example, in the policies and obligations governing the shared pool.

Once a user has joined a shared pool, for example, managed by a payment service provider, the shared pool user or member may have an option to set up a Funding Model. A Funding Model may include, for example, a Pull Model, which may involve opting in to allow other members of the shared pool to pull funds from his or her funding sources into the shared pool. Regarding the Pull Model, each member may set up rules for having funds pulled from a particular funding source when a transaction is initiated or processed ("pull mechanism").

In block 106 of FIG. 1, members may set up rules to allow funds to be "pulled" from their respective funding sources or accounts when the shared pool is used in connection with a transaction(s) ("pull mechanism"). In this regard, user-defined rules may be set up for using the shared pool when a transaction is initiated or processed. That is, a user may setup rules applicable to his or her shared pool membership, including, for example, that the system should request payment authorization for each payment, that authorization is needed only for payments above a certain threshold, etc. In one example, a user or member may set up a policy to indicate to the system that if an attempt is made to use the shared pool to make a payment and the member's contribution is greater than a user-specified threshold, the system may not proceed without user authorization. User authorization may involve the system sending a notification to the user's user device, and expecting a specific response.

Funds may be pulled from the member's authorized funding sources at the time a transaction is processed using the shared pool. In this regard, the member does not have to contribute funds to a shared pool account before a transaction is processed (e.g., before a purchase is made using the shared pool).

A user may generally be a member of multiple groups. In some traditional group payment accounts, members may "push" funds to multiple group payment accounts. In that regard, members may contribute funds to the group payment accounts. Traditionally, if a user has to move funds into each group payment account in advance of any payment that needs to be made out of the group payment account, it may be very difficult for the user as an individual to manage his or her accounts. Also, this type of "push mechanism" may have an inherent issue that any of the members may use the funds in the group payment account, even if they did not contribute to the funds.

In embodiments of the present application, advantageously, the "pull mechanism" may avoid these issues. With the "pull mechanism," a user may be a member of as many pools as he or she wants, without having to contribute a single penny to any of the shared pools. The user may simply setup, at the pool level, certain rules such as a configuration to help the system determine which funding sources should be used by the system when the shared pool is being used in connection with a transaction (e.g., make payment) with the user as a participant to the transaction. Additional configuration at the shared pool level may let the system determine if the user needs to authorize any attempt at payment, and if so, the threshold (e.g., above a certain amount, quantity, etc.) at which the user needs to be requested for the authorization. Configuration at the shared pool level may also dictate the behavior when in the following scenarios: (1) when a user that was selected to participate in a common transaction and is sent a request for authorizing the payment, does not respond within a configured time period (e.g., within 4 hours or other appropriate time period), (2) when a user that was selected to participate in a common transaction declines or rejects the transaction when the user receives a request for authorizing the payment. The system may permit the shared pool to be configured such that the person initiating the payment pays in these scenarios. The system may permit the shared pool to be configured such that all remaining payment participants share the additional payment amount to cover the portion of the user that does not participate, declines or rejects a transaction.

In block 108, when a transaction(s) is initiated, the shared pool may be selected to process the transaction(s). In an embodiment, when a user logs into his or her payment service provider account to check out, the user may choose the shared pool in the payment service provider account to process the transaction, for example, to make the payment.

In block 110, funds may be pulled from each member's funding sources in appropriate amounts according to the rules set up by each member of the shared pool and/or according to any policies governing the shared pool.

In various embodiments, reports including, for example, summary of transactions, may be provided for a funding source. For example, where a funding source for a shared pool user is a payment provider service such as PayPal®, there may be cyclic reports such as automated monthly statements provided to the shared pool users.

In various embodiments, an individual user or member making a payment may get an incentive, for instance, an amount back in the form of a rebate. For example, a gift may come with a $x rebate check, which may be mailed a few weeks later. In these cases, the shared pool members may share the rebate or the contribution may be adjusted to accommodate for the rebate that may be received by the individual making the payment.

According to one or more embodiments, in a digital wallet enabled world where individuals may have incentives such as coupons or gift cards applicable for a specific payment recipient, the system may use these incentives. That is, incentives from the pool members may be used in connection with transactions using the shared pool. As such, the shared pool may support use of incentives such as coupons, gift cards, etc. during a check out process.

In embodiments where it is decided that a purchased item is to be returned for a refund, and once the refund is completed, shared pool members may receive their share of the purchase price refunded back into their account.

A shared pool according to one or more embodiments may lay down the foundation of a trusted friend network. For example, one use of a Trusted Friend network may be in the context of minimizing Risk, that is, a new member to a shared pool and/or a funding source such as PayPal® may have a different level of trust associated with him or her, based on the trust level of the friend network. For example, a payment provider such as PayPal® may associate a risk level ('high risk') with all new users that may be used for the purpose of containing or limiting risk to the payment provider. During the phase when they are deemed as 'high risk', the payment provider may impose limits on the users, to contain risk. The 'high risk' users may be limited to sending a lower amount per day/week/month than 'low risk' users. The 'high risk' users may be limited to using specific financial instruments such as credit cards in which the risk exposure to the payment provider might be lower. As new users engage with the payment provider and build up a history of good behavior, their risk profile may change to 'low risk'. This normal process of risk level progression from 'high risk' to 'low risk' may take time, as this is based on user engagement with the system. However, if the user is observed to be a member of one or more shared pools and has been a payment participant one or more times along with other payment participants that are deemed to be at a lower risk level due to their history with the payment provider, then this shared pool membership combined with payment participant relationship with more trusted users may be used by the risk subsystem to assign a lower risk profile to the newer users as well much sooner. Such elevation of new users to a low risk profile could mean the new users may enjoy high spending limits sooner, and may be deemed eligible to use financial instruments such as a financial institution (e.g., bank) Bank sooner, resulting in more financial upside for the payment provider as well.

It should be noted that a conventional merchant-initiated pull (where a user preauthorizes a merchant to pull from an account for a purchase with that merchant) is different than a shared pool's pull according to embodiments herein as will be described in more detail below.

Merchant Pull

Conventional merchant "pull" mechanisms may exist where a user preauthorizes a merchant to pull from an account for a purchase with that merchant. In that regard, an example of a merchant "pull" may involve the following:

When a user wants to sign up for an online service, for example, a subscription to Netflix® via its website, the user may select or click on the website's 'Start your Free Month', enter an email address/password, enter first name/last name, click on a payment provider service interface, e.g., a PayPal® button, login or sign into the payment provider service, click on Agree and Continue, check the 'I agree' box as commonly known, and click on "Start Membership' to finish the signup. As a result of this process, the online subscription service gets an 'authorization token' from the payment provider service. The online subscription service may then be able to make a payment call to pull a recurring, e.g., monthly subscription amount from the user's payment provider service account using the authorization token. When the online subscription service makes the payment call with the user's authorization token, the appropriate amount may be pulled from the user's account and deposited into the online subscription service's payment provider service account (e.g., into Netflix®'s PayPal® account).

Share Pool Pull

According to one or more embodiments of the present disclosure, a "pull" from a shared pool may involve the following:

A user (U1) may invite one or more other users to join a shared pool, for example, a marketing-technology-team pool. The invited users join the shared pool, for example, U2 and U3 join in.

U1 may setup a funding source hierarchy for this pool, for example, PayPal® Balance with backup funding source as Visa® card xxxx1234. U2 and U3 may also setup their funding source hierarchies for the pool.

In an example, U1, U2 and U3 may want to make a gift purchase for another team mate whose birthday is coming up. U1 may purchase an item as a gift at a certain amount, for example, an electronic device for $450. U1 may go through a checkout process, for example, on a merchant's website, to pay for the item and log into, for example, his or her payment provider service (e.g., PayPal®) account. It should be appreciated that a merchant may include any seller of items or a marketplace.

After logging into his or her payment provider service account, U1 may select the shared pool 'marketing-technology-team' as a funding source to make the payment, and indicate that all pool members will pay an appropriate amount, e.g., an equal amount between the members, or different amounts of a payment according to percentages or other rules set up or determined by the members of the shared pool.

In this example, the system calculates that each of the three pool members U1, U2 and U3 are to pay $150 each thus sharing the cost of the item equally.

The system may pull in the amount $150 from each member's account and record a single payment of $450 going into the merchant's account (less any appropriate payment provider service fees, if applicable).

In various embodiments, the merchant may be made aware that the payment was shared by multiple payment provider service accounts. In other embodiments, the fact that the payment was shared by multiple funding source accounts may be hidden from the merchant, such that the merchant may be shown only the originator of the payment as the payer.

As such, the two examples described above with respect to 'pull' mechanisms illustrate a pull mechanism as applied to merchant-initiated transactions based on a pre-approval setup by the user as well as a system-initiated pull from funding sources such as payment provider service accounts belonging to multiple pool members in the context of using a shared pool to make a payment.

Merchant Pull Triggering a Pull from a Shared Pool

In one or more embodiments, a pull from a shared pool may be triggered from a merchant pull. For example, User 1 (U1) wants to sign up for an online service, e.g., Netflix®, and share the cost with his roommate (U2).

U1 may create a shared pool labeled, for example 'roommates' and invite his roommate U2 to join.

Both U1 and U2 may setup the funding sources to be used for their share of all payments made using the shared pool.

U1 may sign up for the online service (e.g. Netflix® account), elect to pay through a payment service provider (or other preferred funding source), sign into the payment service provider and select the 'roommates' shared pool as the funding source to be used when the online service initiates a payment. As a result, the online service may get an 'authorization token' from the payment provider service.

The online service may then be able to make a payment call, for example, to pull the monthly subscription amount from U1's payment provider service account using this authorization token.

When the online service makes this call, the payment provider service may determine that the funding source setup by U1 is a shared pool and may in turn pull the appropriate amounts from each of the pool members' funding sources (e.g., payment provider service accounts) using the funding sources configured by the individual account holders.

In various embodiments, the shared pool may be used to make a payment, for example, during checkout in an online transaction. Shared pool members may have the ability to select a shipping address from a list of shared pool member's addresses during a check out process, for example, if a transaction requires a shipping address.

The shipping address of any participant member may be used and also, incentives such as coupons may be used when available in any participant member's account.

According to one or more embodiments the system may enable a functionality that may be referred to as "Pay on my behalf".

Figure 2:
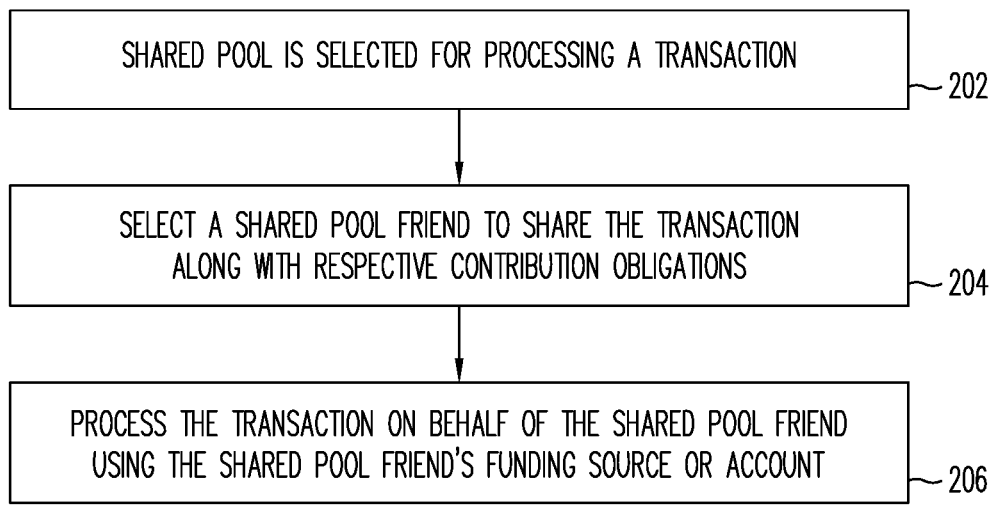
FIG. 2 illustrates a flow diagram for paying on behalf of a member according to an embodiment of the present disclosure.

Referring now to FIG. 2, a flow diagram for paying on behalf of a member is illustrated according to an embodiment of the present disclosure.

In block 202, a shared pool may be selected to process a transaction, for example, to make payment for one or more items.

In block 204, a member making the payment may select one or more shared pool friends to share the transaction along with respective contribution obligations.

In block 206, the transaction may be processed on behalf of a shared pool friend using the shared pool friend's funding source or account. That is, in an embodiment, the shared pool may be used to implement a 'Pay on my behalf' feature. For example, User A may checkout and make a payment for an item using User B's account.

As described above according to one or more embodiments, processing a transaction, for example a payment made using a shared pool, may not have to be split equally across all individual members of the shared pool. While making a payment using the shared pool, the individual member making the payment may select the contributors and set the percentage or amount that each contributing member needs to pay. The individual member making the payment may pick a shared pool, pick a friend to 'share' the payment, set his or her (individual member making the payment) contribution as 0% and his or her friend's contribution as 100%. As such, the friend member may use this shared pool mechanism to authorize the individual member making the payment to 'pay on his or her behalf'.

In an example, a savvy user that frequently makes online purchases may have a friend that may not be as savvy. In this case, a shared pool may be created (or an existing shared pool may be used of which both the user and friend are already members) to enable the user to hunt for a good deal for the friend, go through the checkout process to make the payment, select the shared pool of which the user and the friend are both members, specify the friend as the only payment participant contributing 100% of the payment, and complete checkout selecting the friend's shipping address.

Embodiments of the present disclosure may be advantageous in many situations as set forth in the examples below.

Example—User Case 1

Alice and Bob are married. They both work and want to share common expenses such as rent, internet, cable, groceries, and many other expenses. They discover that they can share and manage the common expenses very easily by setting up a shared pool according to one or more embodiments herein. Alice logs in to her payment provider account (e.g., PayPal®), creates a shared pool named "Alice and Bob Expenses Pool" and invites Bob to join the shared pool. Once Bob joins the shared pool, they specify rules, for example, their Funding Models for the shared pool and become contributors of the shared pool. The shared pool "Alice and Bob Expenses Pool" becomes part of both of their funding source accounts (e.g., PayPal® accounts). They start paying the common expenses from their shared pool and they live happily ever after.

Example—User Case 2

Firat, Gopi and Vinay are starting a new Social Networking startup. One of the challenges they are facing is collaborating on expenses for business needs. They decide to setup a shared pool which they join and share the expenses for their business. Once they need to scale up and buy more hardware, they may buy servers with their shared pool account.

Example—User Case 2.1

Firat, Gopi and Vinay decide to have different contributions to the shared pool as follows: Firat has a 50% stake in the company, and needs to contribute 50% of the expenses. This may be defined in the shared pool policies indicating how much he needs to contribute to the expenses from the shared pool. Gopi and Vinay will each be contributing 25% equally to the expenses. This distributing of the shared pool charges may be handled by Funding Models or according to rules set up by the shared pool members.

Example—User Case 3

A group of friends may want to create a shared pool to be used for sharing expenses that arise when they go out to events, for dinner, etc. However, not all of them may go out for every event. In addition to having an option of using all members of the shared pool to conduct a transaction, while using the shared pool to pay, the individual making the payment may instead select a list of only the members that actually end up going out and paying.

Example—User Case 4

A group of friends that has previously set up a shared pool may want to make a gift purchase for one of their friend's birthday. After the gift has been purchased and paid for by a shared pool member, some other friends might want to participate. One of the other friends may or may not be an existing member of the shared pool. This friend may join the shared pool and become a new member who will end up sharing the expense dues for the birthday gift. As a result, an appropriate amount will be refunded back to the earlier members that made a payment because more individuals are sharing the same expense.

Similarly, the reverse case may happen. An individual that had agreed to share in the expense for the birthday gift may wish to drop out. This may create a scenario in which members that paid some amount earlier may end up paying more to make up for the dues of the individual that dropped out.

Advantageously, embodiments of the present disclosure may afford benefits such as availability of funds, convenience, collaboration and reporting such as sharing common expenses and spending from a common source, etc.

Figure 3:
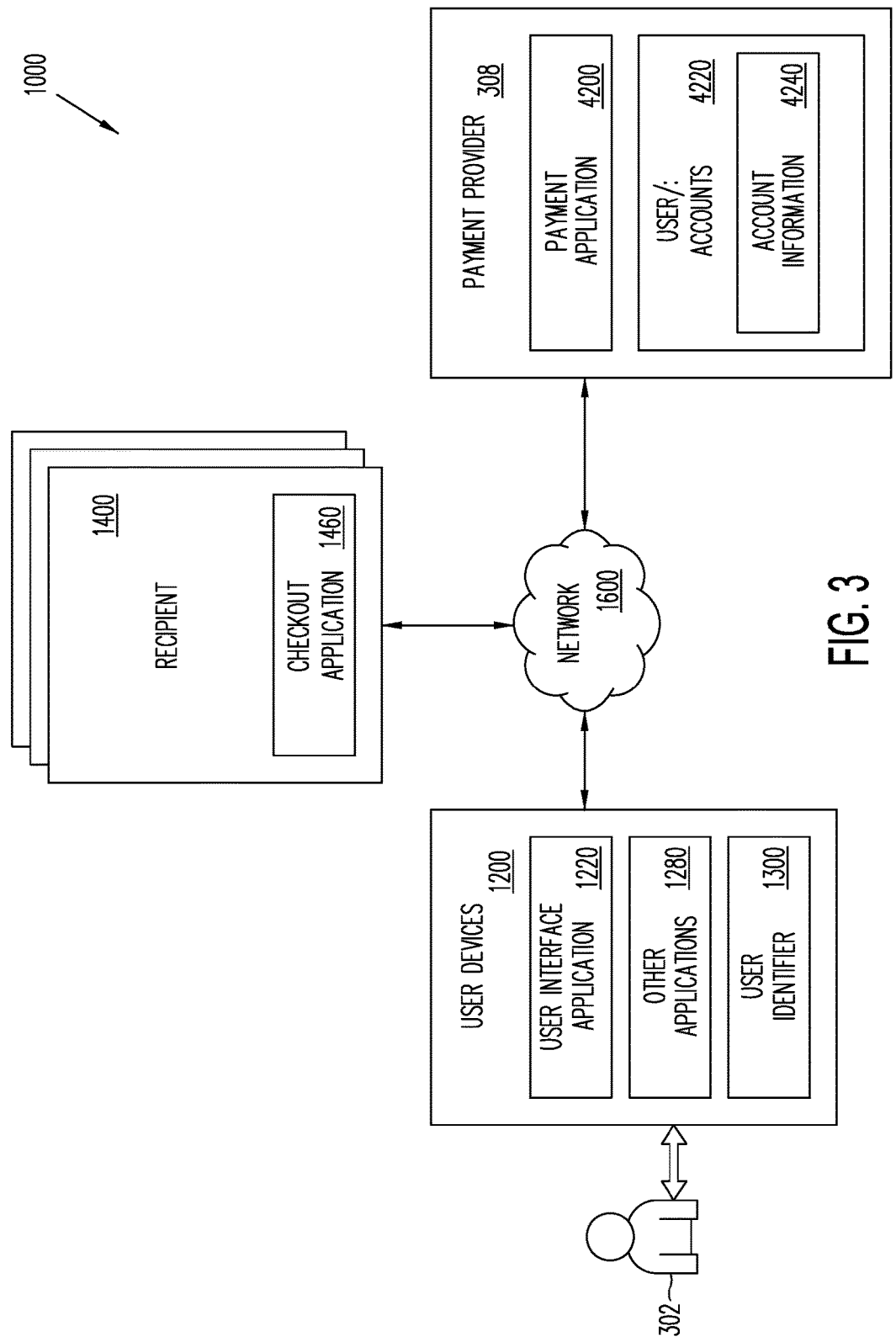
FIG. 3 illustrates a block diagram of a system using a payment service provider according to an embodiment of the present disclosure.

FIG. 3 illustrates a block diagram of a system using a payment service provider according to an embodiment of the present disclosure.

FIG. 3 shows one embodiment of a block diagram of a system 1000 adapted to create, manage or use shared pools over a network 1600. As shown in FIG. 3, the system 1000 includes at least one user device 1200 (e.g., network computing device), one or more recipient devices 1400 (e.g., network server devices), and at least one payment service provider device 308 (e.g., network server device) in communication over the network 1600.

The network 1600, in one embodiment, may be implemented as a single network or a combination of multiple networks. For example, in various embodiments, the network 1600 may include the Internet and/or one or more intranets, landline networks, wireless networks, and/or other appropriate types of communication networks. In another example, the network 1600 may comprise a wireless telecommunications network (e.g., cellular phone network) adapted to communicate with other communication networks, such as the Internet. As such, in various embodiments, the user device 1200, recipient servers 1400, and payment service provider 308 may be associated with a particular link (e.g., a link, such as a URL (Uniform Resource Locator) to an IP (Internet Protocol) address).

The user device 1200, in various embodiments, may be implemented using any appropriate combination of hardware and/or software configured for wired and/or wireless communication over the network 1600. In various examples, the user device 1200 may be implemented as a wireless telephone (e.g., cellular or mobile phone), a tablet, a personal digital assistant (PDA), a personal computer or desktop, a notebook computer, a television set, a game console, a DVR and/or various other generally known types of wired and/or wireless computing devices. It should be appreciated that the user device 1200 may be referred to as a client device or a customer device without departing from the scope of the present disclosure.

The user device 1200, in one embodiment, includes a user interface application 1220, which may be utilized by the user 302 to conduct transactions (e.g., shopping, purchasing, bidding, etc.) with the payment service provider server 308 over the network 1600. For example, the user interface application 1220 may be implemented as an item selection application to track, manage, and store information related to the purchase of items, products, and/or services over the network 1600. In one aspect, purchase expenses may be directly and/or automatically debited from an account related to the user 302 via the user interface application 1220.

In one implementation, the user interface application 1220 comprises a software program, such as a graphical user interface (GUI), executable by a processor that is configured to interface and communicate with the service provider server 308 via the network 1600. In another implementation, the user interface application 1220 comprises a browser module that provides a network interface to browse information available over the network 1600. For example, the user interface application 1220 may be implemented, in part, as a web browser to view information available over the network 1600. In another example, the user 302 is able to access recipient websites, such as merchant websites, via the one or more recipient servers 1400 to view and select, for example, applications, products, and/or services for purchase, and the user 302 is able to purchase applications, products, and/or services from the one or more recipient servers 1400 via the payment service provider server 308. Accordingly, the user 302 may conduct transactions (e.g., purchase and provide payment for applications, products, and/or services) from the one or more recipient servers 1400 via the payment service provider server 308.

The user device 1200, in various embodiments, may include other applications 1280 as may be desired in one or more embodiments of the present disclosure to provide additional features available to the user 302. In one example, such other applications 1280 may include security applications for implementing client-side security features, programmatic client applications for interfacing with appropriate application programming interfaces (APIs) over the network 1600, and/or various other types of generally known programs and/or software applications. In still other examples, the other applications 1280 may interface with the user interface application 1220 for improved efficiency and convenience.

According to an embodiment, the other applications 1280 may include an application that may be loaded on user device 1200 by service provider 308, by a recipient server or by any other appropriate entity. Such application may enable user 302 to create, manage or use one or more shared accounts and/or to easily make payments for applications, products and/or services over user device 1200.

The user device 1200, in one embodiment, may include at least one user identifier 1300, which may be implemented, for example, as operating system registry entries, cookies associated with the user interface application 1220, identifiers associated with hardware of the user device 1200, or various other appropriate identifiers. The user identifier 1300 may include one or more attributes related to the user 302, such as personal information related to the user 302 (e.g., one or more user names, passwords, photograph images, biometric ids, addresses, phone numbers, etc.) and banking information or funding sources (e.g., one or more banking institutions, credit card issuers, user account numbers, security data and information, etc.). In various implementations, the user identifier 1300 may be passed with a user login request to the payment service provider 308 via the network 1600, and the user identifier 1300 may be used by the payment service provider 308 to associate the user 302 with a particular user account maintained by the payment service provider 308.

The one or more recipient servers 1400, in various embodiments, may be maintained by one or more business entities, profit or nonprofit (e.g., merchant sites, resource information sites, utility sites, real estate management sites, social networking sites, charity sites, publications sites, etc.) offering various applications, products, and/or services for purchase and payment.

Each of the recipient servers 1400, in one embodiment, may include a marketplace application, which may be configured to provide information over the network 1600 to the user interface application 1220 of the user device 1200. For example, the user 302 may interact with the marketplace application through the user interface application 1220 over the network 1600 to search and view various applications, products, and/or services available for purchase in a database maintained by a recipient.

Each of the recipient servers 1400, in one embodiment, may include a checkout application 1460, which may be configured to facilitate online transactions (e.g., purchase transactions) by the user 302 of applications, products, and/or services identified by the marketplace application. As such, in one aspect, the checkout application 1460 may be configured to accept payment information from the user 302 over the network 1600.

Each of the recipient servers 1400, in one embodiment, may include at least one recipient identifier, which may be included as part of the one or more applications, products, and/or services made available for purchase so that, e.g., particular applications, products, and/or services are associated with particular recipients. In one implementation, the recipient identifier may include one or more attributes and/or parameters related to the recipient, such as business and banking information. As described above, the user 302 may conduct financial transactions (e.g., selection, purchasing, and/or providing payment for applications, products, and/or services) with each recipient server 1400 via the service provider server 308 over the network 1600.

The payment service provider server 308, in one embodiment, may be maintained by a transaction processing entity, which may provide processing for online financial transactions and/or information transactions between the user 302 and one or more of the recipient servers 1400. As such, the payment service provider 308 includes a service application, which may be adapted to interact with each user device 1200 and/or each recipient server 1400 over the network 1600 to facilitate the selection, purchase, and/or payment of applications, products, and/or services by the user 302 from one or more of the recipient servers 1400. In one example, the payment service provider server 308 may be provided by PayPal®, Inc. and/or eBay® of San Jose, Calif., USA.

The service application, in one embodiment, utilizes a payment processing module to process purchases and/or payments for financial transactions between the user 302 and each of the recipient servers 1400. In one implementation, the payment processing module assists with resolving financial transactions through validation, delivery, and settlement. As such, the service application in conjunction with the payment processing module settles indebtedness between the user 302 and each of the recipient servers 1400, wherein accounts may be directly and/or automatically debited and/or credited of monetary funds in a manner as accepted by the banking industry.

The payment service provider 308, in one embodiment, may be configured to maintain one or more user accounts and recipient accounts in an account database 4220, each of which may include account information 4240 associated with one or more individual users (e.g., user 302) and recipients (e.g., one or more merchants associated with recipient servers 1400). For example, account information 4240 may include private financial information of each user 302 and each recipient associated with the one or more recipient servers 1400, such as one or more account numbers, passwords, credit card information, banking information, or other types of financial information, which may be used to facilitate online financial transactions between the user 302 and the one or more recipients associated with the recipient servers 1400. In various aspects, the methods and systems described herein may be modified to accommodate users and/or recipients that may or may not be associated with at least one existing user account and/or recipient account, respectively.

In one implementation, the user 302 may have identity attributes stored with the payment service provider server 308, and the user 302 may have credentials to authenticate or verify identity with the payment service provider server 308. User attributes may include personal information and banking information, as previously described. In various aspects, the user attributes may be passed to the payment service provider server 308 as part of a login, selection, purchase, and/or payment request, and the user attributes may be utilized by the payment service provider server 308 to associate the user 302 with one or more particular user accounts maintained by the payment service provider server 308.

The system described above with respect to the embodiment of FIG. 3 may be used to set up and facilitate payment in connection with shared pools according to one or more embodiments as described above.

Although various components and steps have been described herein as being associated with user device 1200, one or more recipient servers 1400, and payment service provider 308 of FIG. 3, it is contemplated that the various aspects of such servers illustrated in FIG. 3 may be distributed among a plurality of servers, devices, and/or other entities.

FIG. 3 illustrates an exemplary embodiment of a network-based system 1000 for implementing one or more processes described herein. As shown, network-based system 1000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 3 may be deployed in other ways and that the operations performed and/or the services provided by such servers may be combined or separated for a given implementation and may be performed by a greater number or fewer number of servers. One or more servers may be operated and/or maintained by the same or different entities.

Figure 4:
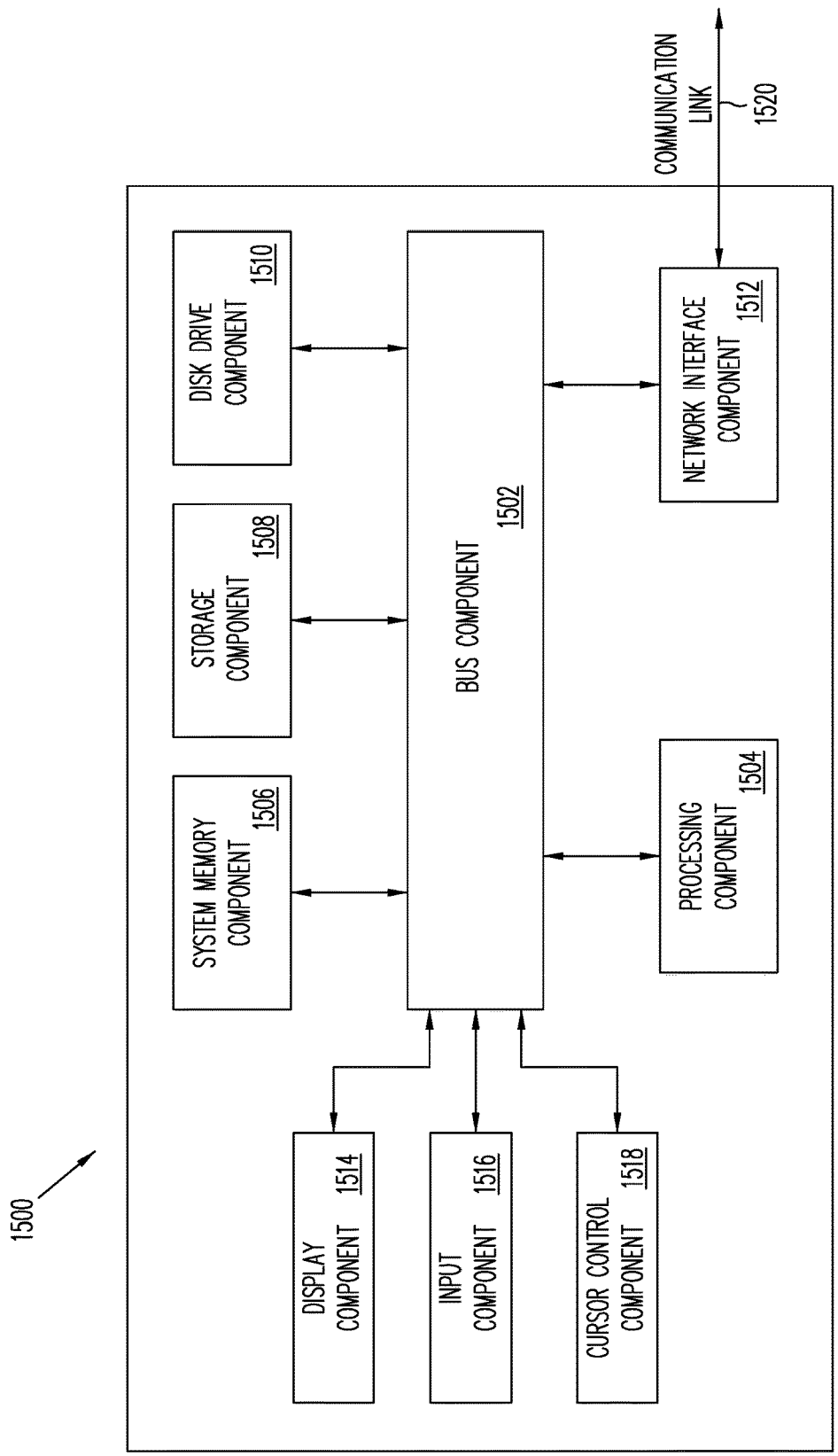
FIG. 4 illustrates a block diagram of a system for implementing a device according to one embodiment of the present disclosure.

Referring now to FIG. 4 a block diagram of a system for implementing a device is illustrated according to one embodiment of the present disclosure.

FIG. 4 is a block diagram of a system 1500 suitable for implementing embodiments of the present disclosure, including user device 1200, one or more recipient servers or devices 1400, and payment service provider 180 server or device. System 1500, such as part of a cell phone, tablet, personal computer and/or a network server, includes a bus 1502 or other communication mechanism for communicating information, which interconnects subsystems and components, including one or more of a processing component 1504 (e.g., processor, micro-controller, digital signal processor (DSP), etc.), a system memory component 1506 (e.g., RAM), a static storage component 1508 (e.g., ROM), a network interface component 1512, a display component 1514 (or alternatively, an interface to an external display), an input component 1516 (e.g., keypad or keyboard), and a cursor control component 1518 (e.g., a mouse pad).

In accordance with embodiments of the present disclosure, system 1500 performs specific operations by processor 1504 executing one or more sequences of one or more instructions contained in system memory component 1506. Such instructions may be read into system memory component 1506 from another computer readable medium, such as static storage component 1508. These may include instructions to create accounts, process financial transactions, make payments, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 1504 for execution. Such a medium may take many forms, including but not limited to, non-volatile media, volatile media, and transmission media. In various implementations, volatile media includes dynamic memory, such as system memory component 1506, and transmission media includes coaxial cables, copper wire, and fiber optics, including wires that comprise bus 1502. Memory may be used to store visual representations of the different options for payments or financial transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 1500. In various other embodiments, a plurality of systems 1500 coupled by communication link 1520 (e.g., network 1600 of FIG. 10, LAN, WLAN, PTSN, or various other wired or wireless networks) may perform instruction sequences to practice the disclosure in coordination with one another. Computer system 1500 may transmit and receive messages, data, information and instructions, including one or more programs (i.e., application code) through communication link 1520 and communication interface 1512. Received program code may be executed by processor 1504 as received and/or stored in disk drive component 1510 or some other non-volatile storage component for execution.

In view of the present disclosure, it will be appreciated that various methods and systems have been described according to one or more embodiments for creating and managing shared pools.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure.

Having thus described embodiments of the disclosure, persons of ordinary skill in the art will recognize that changes may be made in form and detail without departing from the scope of the disclosure. Thus the disclosure is limited only by the claims.

What is claimed is:

1. A method, comprising:
   receiving, via a wireless communication connection, a request to create an electronic shared payment pool, the request including information about a plurality of users invited to participate in the electronic shared payment pool;
   receiving, from each of the plurality of users, a funding source information including a funding source of the each of the users for use with the electronic shared payment pool, and the electronic shared payment pool created without pulling funds from the funding sources of the plurality of users;
   establishing, in response to the received funding source information, shared payment pool rules for the each of the users that participate in the electronic shared payment pool, the shared payment pool rules including a monetary threshold for the each of the users for enabling funds to be pulled from the funding source of the each of the users;
   receiving, via the wireless communication connection, from a first user of the plurality of users a request to use the electronic shared payment pool to pay for a prospective transaction;
   in response to the request, pulling, via the wireless communication connection, funds from each of the funding sources of the each of the users in the electronic shared payment pool, wherein the pulling of the funds is performed automatically without requiring an approval from each of the users as long as an amount of the funds pulled is below the monetary threshold for that user; and
   facilitating the prospective transaction using the electronic shared payment pool.

2. The method of claim 1, further comprising:
   retrieving, in response to receiving the request to use the electronic shared payment pool, biometric identification information from a device associated with the first user;
   identifying the first user based on the retrieved biometric identification information; and
   commencing, the request to pull funds from each of the funding sources of the each of the users in the electronic shared payment pool.

3. The method of claim 2, further comprising:
   retrieving, from the funding source information, cookies associated with a user interface application installed on the device for identifying the first user.

4. The method of claim 1, wherein the establishing of the shared payment pool rules include establishing a percentage amount split for the pulling of funds from each of the funding sources of the each of the users in the electronic shared payment pool.

5. The method of claim 1, further comprising:
   concealing, from another party involved in the prospective transaction, information indicating that the electronic shared payment pool is shared among the plurality of the users, wherein the another party is not involved in the electronic shared payment pool.

6. The method of claim 1, wherein the establishing of the shared payment pool rules include establishing a hierarchy of multiple funding sources specified by at least one of the plurality of users to fund the electronic shared payment pool.

7. The method of claim 1, further comprising:
   designating one of the plurality of users as an administrator of the electronic shared payment pool; and
   removing one of the users in the plurality of users from the electronic shared payment pool in response to a request from the administrator.

8. A system, comprising:
   a non-transitory memory; and
   one or more hardware processors coupled to the non-transitory memory and configured to read instructions from the non-transitory memory to cause the system to perform operations comprising:
   receiving, via a wireless communication connection, a request to create an electronic shared payment pool, the request including information about a plurality of users invited to participate in the electronic shared payment pool;
   receiving, from each of the plurality of users, a funding source information including a funding source of the each of the users for use with the electronic shared payment pool, and the electronic shared payment pool created without pulling funds from the funding sources of the plurality of users;
   establishing, in response to the received funding source information, shared payment pool rules for the each of the users that participate in the electronic shared payment pool, the shared payment pool rules including a monetary threshold for the each of the users for enabling funds to be pulled from the funding source of the each of the users;
   receiving, via the wireless communication connection, from a first user of the plurality of users a request to use the electronic shared payment pool to pay for a prospective transaction;
   in response to the request, pulling, via the wireless communication connection, funds from each of the funding sources of the each of the users in the electronic shared payment pool, wherein the pulling of the funds is performed automatically without requiring an approval from each of the users as long as an amount of the funds pulled is below the monetary threshold for that user; and
   facilitating the prospective transaction using the electronic shared payment pool.

9. The system of claim 8, wherein the operations further comprise:
    retrieving, in response to receiving the request to use the electronic shared payment pool, biometric identification information from a device associated with the first user;
    identifying the first user based on the retrieved biometric identification information; and
    commencing, the request to pull funds from each of the funding sources of the each of the users in the electronic shared payment pool.

10. The system of claim 8, wherein the establishing of the shared payment pool rules include establishing a percentage amount split for the pulling of funds from each of the funding sources of the each of the users in the electronic shared payment pool.

11. The system of claim 8, wherein the operations further comprise:
    concealing, from another party involved in the prospective transaction, information indicating that the electronic shared payment pool is shared among the plurality of the users, wherein the another party is not involved in the electronic shared payment pool.

12. The system of claim 8, wherein the establishing of the shared payment pool rules include establishing a hierarchy of multiple funding sources specified by at least one of the plurality of users to fund the electronic shared payment pool.

13. The system of claim 8, wherein the operations further comprise:
    designating one of the plurality of users as an administrator of the electronic shared payment pool; and
    removing one of the users in the plurality of users from the electronic shared payment pool in response to a request from the administrator.

14. A non-transitory machine-readable medium having stored thereon machine-readable instructions executable to cause a machine to perform operations comprising:
    receiving, via a wireless communication connection, a request to create an electronic shared payment pool, the request including information about a plurality of users invited to participate in the electronic shared payment pool;
    receiving, from each of the plurality of users, a funding source information including a funding source of the each of the users for use with the electronic shared payment pool, and the electronic shared payment pool created without pulling funds from the funding sources of the plurality of users;
    establishing, in response to the receiving the funding source information, shared payment pool rules for the each of the users that participate in the electronic shared payment pool, the shared payment pool rules including a monetary threshold for the each of the users for enabling funds to be pulled from the funding source of the each of the users;
    receiving, via the wireless communication connection, from a first user of the plurality of users a request to use the electronic shared payment pool to pay for a prospective transaction;
    in response to the request, pulling, via the wireless communication connection, funds from each of the funding sources of the each of the users in the electronic shared payment pool, wherein the pulling of the funds is performed automatically without requiring an approval from each of the users as long as an amount of the funds pulled is below the monetary threshold for that user; and
    facilitating the prospective transaction using the electronic shared payment pool.

15. The non-transitory machine-readable medium of claim 14, wherein the operations further comprise:
    retrieving, in response to receiving the request to use the electronic shared payment pool, biometric identification information from a device associated with the first user;
    identifying the first user based on the retrieved biometric identification information; and
    commencing, the request to pull funds from each of the funding sources of the each of the users in the electronic shared payment pool.

16. The non-transitory machine-readable medium of claim 14, wherein the establishing of the shared payment pool rules include establishing a percentage amount split for the pulling of funds from each of the funding sources of the each of the users in the electronic shared payment pool.

17. The non-transitory machine-readable medium of claim 14, wherein the operations further comprise:
    concealing, from another party involved in the prospective transaction, information indicating that the electronic shared payment pool is shared among the plurality of the users, wherein the another party is not involved in the electronic shared payment pool.

18. The non-transitory machine-readable medium of claim 14, wherein the establishing of the shared payment pool rules include establishing a hierarchy of multiple funding sources specified by at least one of the plurality of users to fund the electronic shared payment pool.

19. The non-transitory machine-readable medium of claim 14, wherein the operations further comprise:
    designating one of the plurality of users as an administrator of the electronic shared payment pool; and
    removing one of the users in the plurality of users from the electronic shared payment pool in response to a request from the administrator.

20. The non-transitory machine-readable medium of claim 14, wherein the operations further comprise, before the pulling of the funds: determining a location of each of the plurality of users, wherein the pulling of the funds comprises pulling the funds only from the users whose locations have been determined to be the same as the location of the first user.

* * * * *